United States Patent
Haijima et al.

(10) Patent No.: US 7,360,314 B2
(45) Date of Patent: Apr. 22, 2008

(54) LEVELING METHOD AND LEVELING DEVICE

(75) Inventors: Yasuhito Haijima, Itabashi-ku (JP); Kiyoko Suzuki, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 1 day.

(21) Appl. No.: 11/583,614

(22) Filed: Oct. 19, 2006

(65) Prior Publication Data
US 2007/0195313 A1 Aug. 23, 2007

(30) Foreign Application Priority Data
Feb. 21, 2006 (JP) ............... 2006-043835

(51) Int. Cl.
*G01C 5/00* (2006.01)

(52) U.S. Cl. ........................................ 33/290

(58) Field of Classification Search .............. 33/290, 33/291, 292, 365, 366.11; 702/150, 151, 702/154
See application file for complete search history.

(56) References Cited

U.S. PATENT DOCUMENTS

| | | | | |
|---|---|---|---|---|
| 5,777,899 A | * | 7/1998 | Kumagai | ............ 33/291 |
| 7,228,635 B2 | * | 6/2007 | Jian et al. | ............ 33/291 |
| 2002/0138998 A1 | * | 10/2002 | Hamada | ............ 33/290 |
| 2004/0204902 A1 | * | 10/2004 | Kokubo et al. | ............ 702/151 |
| 2006/0021236 A1 | * | 2/2006 | Endo | ............ 33/290 |
| 2007/0089309 A1 | * | 4/2007 | Kodaira | ............ 33/290 |

FOREIGN PATENT DOCUMENTS

JP 2001-183134 7/2001

* cited by examiner

*Primary Examiner*—G. Bradley Bennett
(74) *Attorney, Agent, or Firm*—Nields & Lemack

(57) ABSTRACT

A leveling method in a device main unit with tilt sensors, wherein said method comprises a step of obtaining a response delay of said tilt sensors in advance, a step of tilting said device main unit in a first direction so that said tilt sensors detect a first 0 point, a step of tilting said device main unit in a second direction reverse to said first direction so that a second 0 point is detected after said first 0 point has been detected, a step of obtaining a time up to the detection of both 0 points, a step of calculating a driving time to tilt in the first direction further from said second direction based on said time and said response delay, a step of tilting said device main unit for the driving time, a step of maintaining tilting condition for a predetermined time after tilting and a step of converging by performing leveling operation based on detection result of said tilt sensors after the predetermined time passing.

5 Claims, 5 Drawing Sheets

LEVELING METHOD AND LEVELING DEVICE

BACKGROUND OF THE INVENTION

The present invention relates to a leveling method and a leveling device to be used in a measuring equipment such as a surveying instrument.

When measurement is performed by using a measuring equipment, e.g. a surveying instrument, first of all, it is necessary to install the surveying instrument at horizontal condition, and the surveying instrument is provided with a leveling device to make the installing condition horizontal.

Referring to FIG. 4, brief description will be given below on a surveying instrument provided with a leveling device. The surveying instrument shown in FIG. 4 is a rotary laser device for forming a reference plane by projecting a laser beam by rotary irradiation.

The rotary laser device 1 comprises a casing 2 and a laser projector 4 with a projection light optical axis 3. The laser projector 4 is accommodated in the casing 2 and can be tilted in an arbitrary direction.

A rotating unit 5 is rotatably mounted on upper portion of the laser projector 4, and a pentagonal prism 6 is provided on the rotating unit 5.

A scanning gear 7 is mounted on the rotating unit 5, and a scanning motor 9 with a driving gear 8 is arranged on the laser projector 4. The rotating unit 5 is rotated and driven by the scanning motor 9 via the driving gear 8 and the scanning gear 7.

Within the casing 2, two sets of X-axis tilting mechanism 11 and Y-axis tilting mechanism (one of them is not shown) are arranged around the laser projector 4 with respect to X-axis and Y-axis respectively. The X-axis tilting mechanism 11 comprises an X-axis tilting motor 12, an X-axis tilting screw 13 with a rotation center in a direction parallel to the laser projector 4, and a sliding nut 14 screwed with the X-axis tilting screw 13. As the X-axis tilting motor 12, a motor able to control rotation angle, e.g. a stepping motor, is used.

The laser projector 4 comprises two tilting arms 15 (one of them is not shown) running perpendicularly to the projection light optical axis 3 and extending in horizontal direction. The two tilting arms 15 perpendicularly cross each other, and the tilting arm 15 is engaged with the sliding nut 14 via a pin.

The X-axis tilting motor 12 can rotate the X-axis tilting screw 13 via a driving gear 16 and a tilting gear 17. By rotation of the X-axis tilting screw 13, the sliding nut 14 is moved up or down. By moving up or down of the sliding nut 14, the tilting arm 15 is tilted, and the laser projector 4 is tilted.

Another set of the Y-axis tilting mechanism not shown in the figure can tilt the laser projector 4 in a direction perpendicularly crossing the tilting direction of the X-axis tilting mechanism 11 by the same procedure as the procedure of the X-axis tilting mechanism 11.

In a plane, which perpendicularly crosses the projection light optical axis 3, there are provided an X-axis tilt sensor 18 and a Y-axis tilt sensor 19. The X-axis tilt sensor 18 perpendicularly crosses the Y-axis tilt sensor 19 and runs in parallel to the tilting arm 15. By the X-axis tilt sensor 18 and the Y-axis tilt sensor 19, tilt angle of the laser projector 4 can be detected in an arbitrary direction. Based on the detection results of the X-axis tilt sensor 18 and the Y-axis tilt sensor 19, the laser projector 4 is tilted by two sets of the X-axis tilting mechanism 11 and the Y-axis tilting mechanism (one of them is not shown) via two tilting arms (one of them is not shown), and leveling can be performed so that the laser projector 4 is in vertical position and the laser projector 4 can be tilted at an arbitrary angle.

Under condition that the laser projector 4 is leveled in vertical position, a laser beam is emitted from the laser projector 4. The laser beam is deflected in horizontal direction by the pentagonal prism 6 and is projected in horizontal direction. The rotating unit 5 is rotated by the scanning motor 9 via the driving gear 8 and the scanning gear 7. By rotating the rotating unit 5, the laser beam is projected by rotary irradiation, and a horizontal reference plane is formed.

The X-axis tilting motor 12 rotates the X-axis tilting screw 13 by a predetermined rotation amount (a predetermined number of pulses) from the condition where the laser projector 4 is leveled once. And then, the laser projector 4 can be tilted at a predetermined angle. Under the condition where the laser projector 4 has tilted, by projecting the laser beam by rotary irradiation, a tilt reference plane is formed.

As described above, when a reference plane is formed by the rotary laser device 1, the rotary laser device 1 is leveled at first. Now, description will be given on a conventional leveling method by referring to FIG. 5.

FIG. 5 shows tilt angle and leveling time, in case that the tilt sensor is an optical type tilt sensor. A curve Q in FIG. 5 indicates a tilt angle of the optical type tilt sensor, and a curve S indicates an output signal of the optical type tilt sensor.

To simplify the explanation, description will be given below on the leveling relating to the X-axis tilt sensor 18.

The X-axis tilt sensor 18 is designed to detect a tilt angle by the position of an air bubble within a bubble tube filled with liquid. In this respect, response delay is caused by the movement of the air bubble when the X-axis tilt sensor 18 is tilted. Therefore, the response delay of the X-axis tilt sensor 18 must be taken into account in the leveling operation.

Also, in the X-axis tilt sensor 18, angle can be detected in a range of very small angle. However, if it is beyond the detection range, tilting direction can be detected but the tilt angle itself cannot be detected. As the X-axis tilt sensor 18 has these characteristics, the measurement is performed in two regions: a region of dynamic range where tilt angle can be measured, and the region beyond dynamic range where only tilting direction can be detected.

Specifically, as shown in FIG. 5, in the region beyond dynamic range, a direction, in which the X-axis tilt sensor 18 is tilted, is detected. And the rotary laser device 1 is tilted in a direction reverse to the direction detected by the X-axis tilting mechanism 11. Next, it is judged whether a target value (a preset and stored 0 value) of output signal of the X-axis tilt sensor 18 has been passed or not. When it is confirmed that the target value has been passed, tilting speed is decreased by the X-axis tilting mechanism 11, and the rotary laser device 1 is tilted so that tilting direction of the X-axis tilt sensor 18 is reversed. When it is again confirmed that the target value has been passed, the tilting speed is decreased further by the X-axis tilting mechanism 11, and the rotary laser device 1 is tilted so that the tilting direction of the X-axis tilt sensor 18 is reversed again. By repeating these procedures, it is possible to attenuate the region of dynamic range and to perform leveling of the rotary laser device 1 in horizontal direction.

Next, when the detected tilt angle is entered the region of dynamic range, the leveling operation is slowed down, and leveling is performed in horizontal direction so that hunting does not occur.

In the conventional leveling method as described above, the X-axis tilt sensor 18 is tilted so that the X-axis tilt sensor 18 passes through the target value (a preset and stored 0 value), and tilting direction of the X-axis tilt sensor 18 is repeatedly reversed each time horizontal direction (i.e. the target value) is passed through, and detection angle of the X-axis tilt sensor 18 is converged so that detection angle of the X-axis tilt sensor 18 is turned to 0 when entering the region of dynamic range. In this case, problem may arise that much time is required until the leveling operation is completed.

SUMMARY OF THE INVENTION

It is an object of the present invention to provide a leveling method and a leveling device, by which it is possible to shorten the converging time of horizontal direction of a tilt sensor in leveling operation and to complete the leveling operation quickly.

To attain the above object, the present invention provides a leveling method in a device main unit with tilt sensors, wherein the method comprising a step of obtaining a response delay of the tilt sensors in advance, tilting the device main unit in a first direction so that the tilt sensors detect a first 0 point, a step of tilting the device main unit in a second direction reverse to the first direction so that a second 0 point is detected after the first 0 point has been detected, a step of obtaining a time up to the detection of both 0 points, a step of calculating a driving time to tilt in the first direction further from the second direction based on the time and the response delay, a step of tilting the device main unit for the driving time, a step of maintaining tilting condition for a predetermined time after tilting and a step of converging by performing leveling operation based on detection result of the tilt sensors after the predetermined time passing. Also, the present invention provides the leveling method as described above, wherein the driving speed to tilt in the second direction is ½ of the driving speed to drive in the first direction, and driving speed to tilt further from the second direction to the first direction is the same as the driving speed in the second direction. Further, the present invention provides the leveling method as described above, wherein the driving time to tilt further from the second direction to the first direction is ⅓ of the time for detection of both the 0 points. Also, the present invention provides the leveling method as described above, wherein the time to tilt further from the second direction to the first direction and to maintain the tilting condition after tilting is shorter than 1.6 seconds.

Further, the present invention provides a leveling device comprising a device main unit, tilt sensors provided with said device main unit and a motor for tilting and driving the device main unit and a control unit for controlling the motor, wherein the control unit obtains response delay of the tilt sensors in advance, tilts the device main unit in a first direction so that the tilt sensors detect a first 0 point, tilts said device main unit in a second direction reverse to the first direction so that a second 0 point is detected after the first 0 point has been detected, obtains a time up to the detections of both 0 points, calculates a driving time to tilt in the first direction further based on the time and the response delay, tilts the device main unit for during the driving time, maintains tilting condition for a predetermined time after tilting, and converges by leveling operation based on the detection of the tilt sensors after the predetermined time passing.

The present invention provides a leveling method in a device main unit with tilt sensors, wherein the method comprising a step of obtaining a response delay of the tilt sensors in advance, tilting the device main unit in a first direction so that the tilt sensors detect a first 0 point, a step of tilting the device main unit in a second direction reverse to the first direction so that a second 0 point is detected after the first 0 point has been detected, a step of obtaining a time up to the detection of both 0 points, a step of calculating a driving time to tilt in the first direction further from the second direction based on the time and the response delay, a step of tilting the device main unit for the driving time, a step of maintaining tilting condition for a predetermined time after tilting and a step of converging by performing leveling operation based on detection result of the tilt sensors after the predetermined time passing. As a result, converging time for detection of horizontal position of the tilt sensor can be shortened and leveling operation can be quickly performed.

Also, the present invention provides the present invention provides a leveling device comprising a device main unit, tilt sensors provided with said device main unit and a motor for tilting and driving the device main unit and a control unit for controlling the motor, wherein the control unit obtains response delay of the tilt sensors in advance, tilts the device main unit in a first direction so that the tilt sensors detect a first 0 point, tilts said device main unit in a second direction reverse to the first direction so that a second 0 point is detected after the first 0 point has been detected, obtains a time up to the detections of both 0 points, calculates a driving time to tilt in the first direction further based on the time and the response delay, tilts the device main unit for during the driving time, maintains tilting condition for a predetermined time after tilting, and converges by leveling operation based on the detection of the tilt sensors after the predetermined time passing. Thus, converging time for detection of horizontal position of the tilt sensor can be shortened and leveling operation can be quickly performed.

DETAILED DESCRIPTION OF THE PREFERRED EMBODIMENT

Description will be given below on the best mode for carrying out the present invention referring to the attached drawings.

Figure 1:
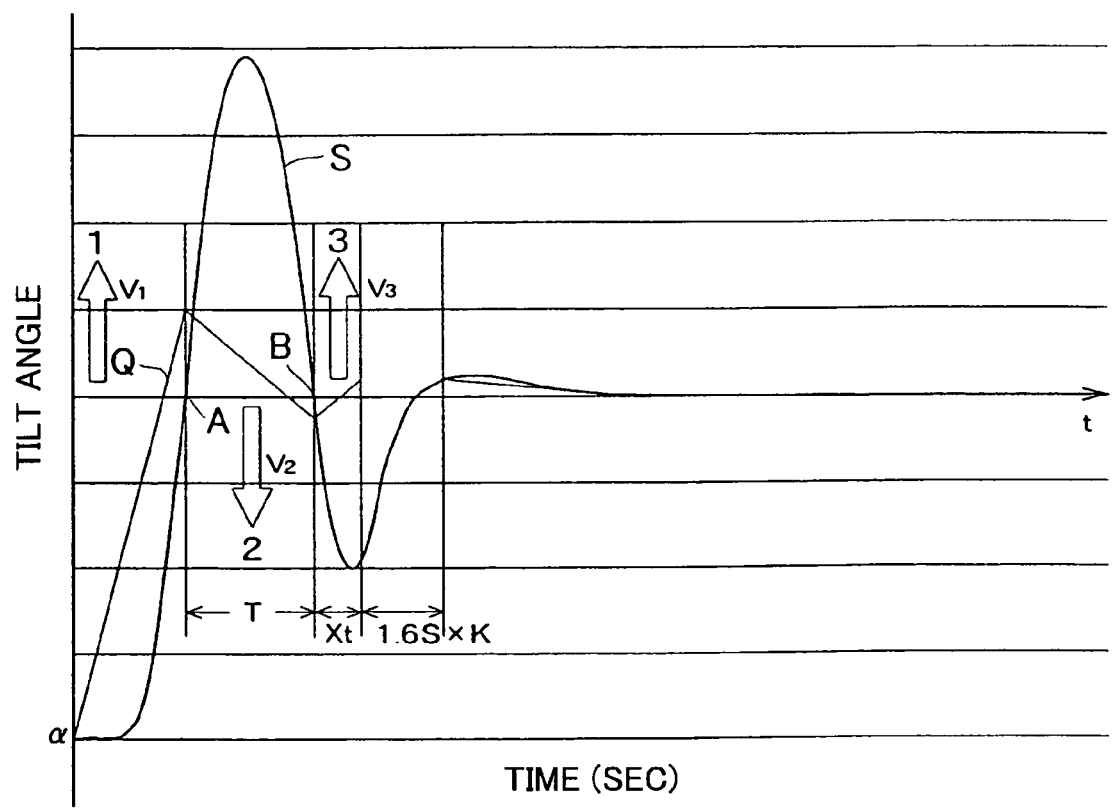
FIG. 1 is a graphic diagram to show output condition of a tilt sensor in leveling operation in an embodiment of the present invention.
Figure 4:
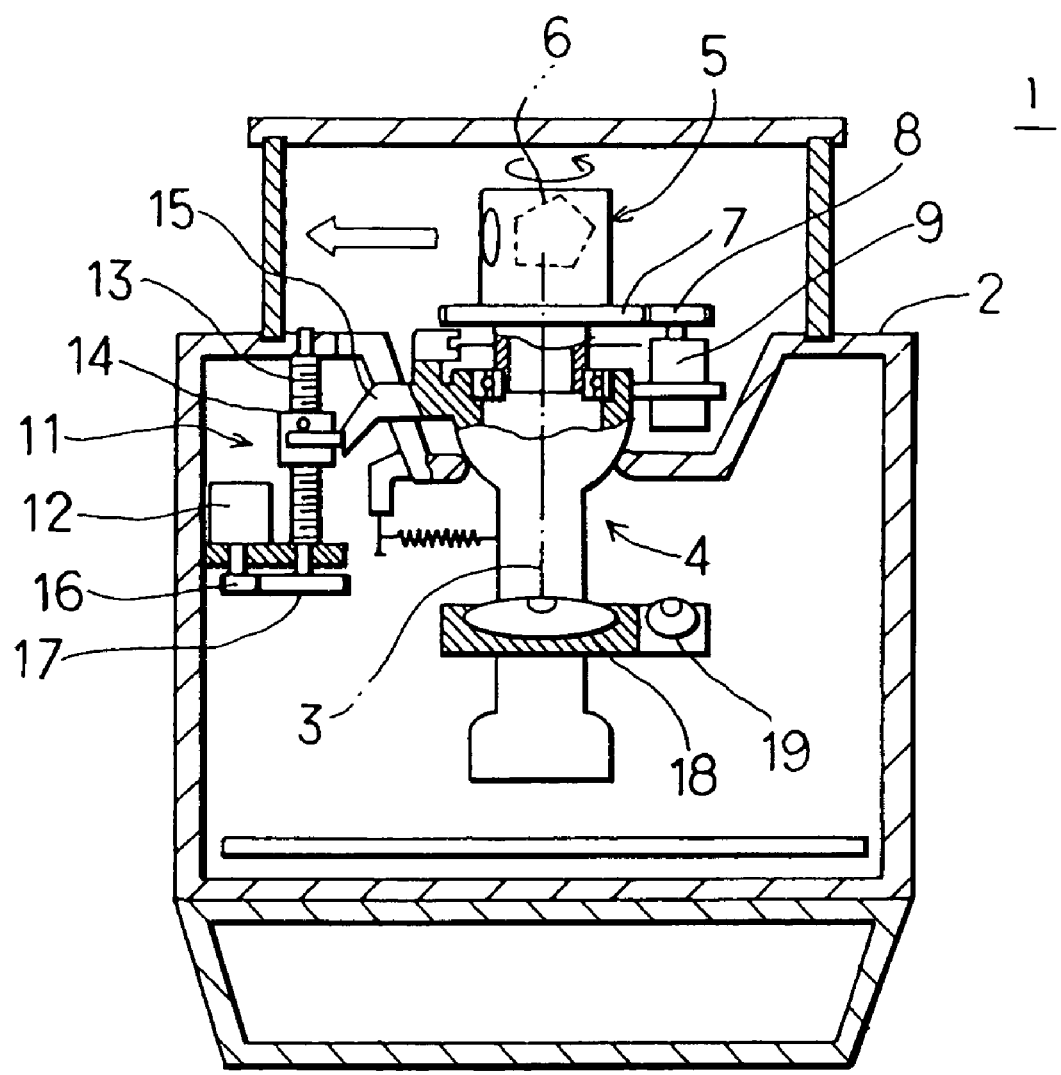
FIG. 4 is a cross-sectional view of a surveying instrument, i.e. an example of the device, in which the present invention is carried out.
Figure 5:
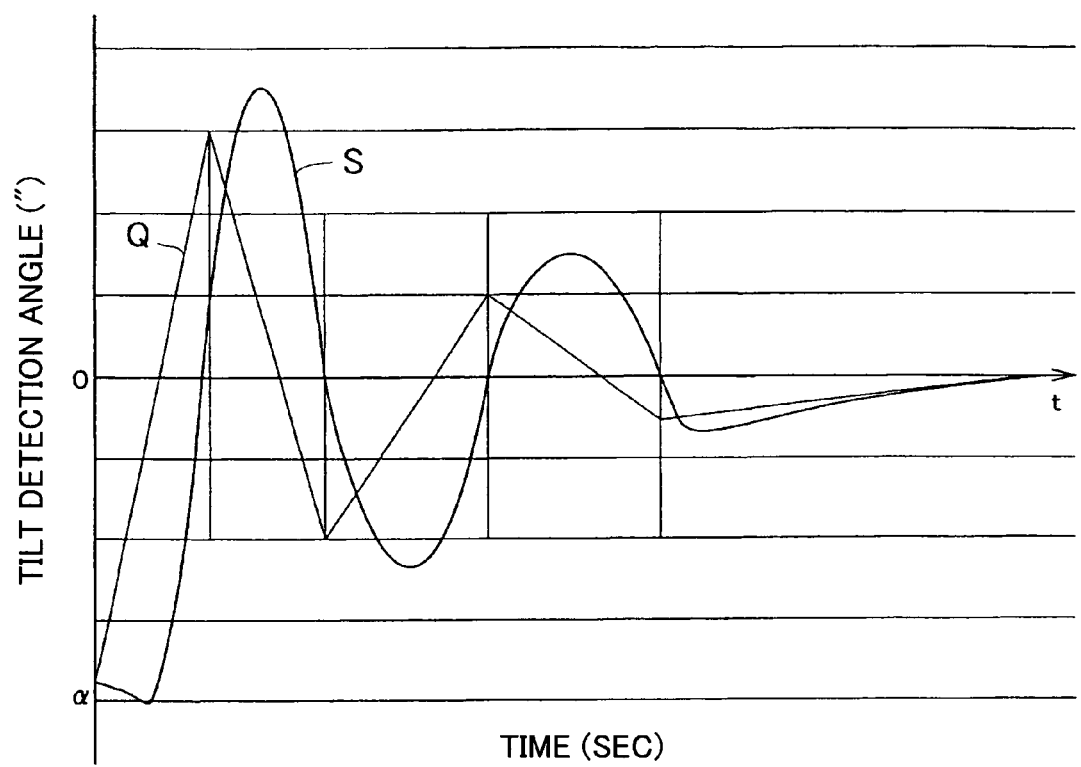
FIG. 5 is a graphic diagram to show output condition of a tilt sensor in conventional type leveling operation.

As a surveying equipment, for which the present invention is carried out, a surveying instrument as shown in FIG. 4 is taken as an example. First, description will be given on the principle of the present invention by referring to FIG. 1 and FIG. 2. To simplify the explanation, description will be given below on the leveling of X-axis. In FIG. 1, a curve Q represents a tilt angle of a laser projector 4, and a curve S represents a detection angle outputted by an X-axis tilt sensor 18.

It is supposed here that the surveying instrument is not in horizontal condition, and the surveying instrument is tilted at an angle of maximum detection angle α or more of the X-axis tilt sensor 18. The X-axis tilt sensor 18 detects a tilting direction.

Based on the detection result of the X-axis tilt sensor 18, an X-axis tilting motor 12 is driven in a direction 1, in which detection angle of the X-axis tilt sensor 18 is turned to 0°, and the laser projector 4 is tilted. The X-axis tilting motor 12 is rotated at a constant speed, for instance at a maximum speed V1 (Step 01).

The X-axis tilt sensor 18 detects 0 position (point A). Time counting is started from the time of detection of the point A to the time of detection of the next 0 position (Step 02). At the moment when 0 position (point A) is detected by the X-axis tilt sensor 18, actual tilt of the device main unit is beyond 0 position due to the response delay of the X-axis tilt sensor 18. In this respect, the X-axis tilting motor 12 is rotated at a constant speed, i.e. at a predetermined speed V2 lower than the maximum speed V1, in reverse direction 2 (Step 03). It is supposed here that the rotation speed V2 in reverse direction is: V2=V1/2.

The device main unit is tilted in the reverse direction 2, and the X-axis tilt sensor 18 detects 0 position (point B) again. The counting is terminated at the moment when the point B is detected (Step 04). In the reverse direction 2 also, the actual tilt angle is still beyond the 0 position due to response delay of the X-axis tilt sensor 18.

Therefore, the X-axis tilting motor 12 is driven reversely toward convergence for a driving time of Xt at a speed V3 toward a direction 3. The driving time Xt, in case that the X-axis tilting motor 12 is driven reversely, is calculated based on a time T from the point A to the point B.

The X-axis tilting motor 12 driven in the direction 1 is rotated at a preset speed (at a known speed V1) and moreover at a constant speed. In case the X-axis tilting motor 12 is driven in the reverse direction 2, the X-axis tilting motor 12 is rotated at a preset speed (at a known speed V2) and moreover at a constant speed. As a result, the time T is a specific parameter to represent response delay of the X-axis tilt sensor 18. The response delay is caused by viscosity of the liquid in the X-axis tilt sensor 18 and the response delay is influenced by temperature. For instance, when temperature is low, the viscosity of the liquid is high, and the response time T of the X-axis tilt sensor 18 will be longer.

Here, it is supposed that a parameter to indicate the response delay is a response delay coefficient η. The response delay coefficient η is a coefficient, which varies depending on the temperature T. The driving time Xt is obtained as (KT×η). K is a coefficient, which is experimentally determined together with a value V3 as described later. In the present embodiment, K=⅓.

It is assumed that the response delay coefficient η is to be obtained in advance by experiment and actual measurement. For instance, the response delay is obtained and measuring output speed, output value, etc. of detection angle with respect to mechanical tilting speed of the X-axis tilt sensor 18 when the X-axis tilt sensor 18 is tilted at known speeds of V1 and V2 by adequately changing the temperature. Also, response speed of the X-axis tilt sensor 18 with respect to an arbitrary tilt angle is obtained in advance.

The speed or velocity V1 is obtained by giving consideration on such as a load of the X-axis tilting motor 12 and on hunting of the X-axis tilt sensor 18. In the present embodiment, it is a rotation speed to tilt the device main unit by an angle of 1° for several seconds (3 to 5 seconds). If the speed V2 is too fast, more time is required for convergence of the tilt sensor. If the speed V2 is too slow, more time is required for leveling. In the present embodiment, V2=V1/2. For the degree of deceleration, an optimal value is selected by taking the response delay coefficient η into account.

The value of the speed V3 is also set from the results of experiment and actual measurement similarly to the case of the response delay coefficient η, and the value of speed V3 is regarded as a known preset value. The value of the speed V3 may be selected in such manner that a plurality of values are set at first and an adequate value is selected depending on the value of the time T. For the value of V3 in the present embodiment, the driving time is regarded as a variable, and the value of V3 is set as: V3=V2=V1/2.

Therefore, when the X-axis tilting motor 12 is driven in the direction 3 at the speed V3 for a driving time Xt (Step 06), the driving time Xt can be set so that the tilt angle of the device main unit is substantially within the range of 3', for instance. The driving time Xt is determined by Xt=KT×η and K=⅓ and by the response delay coefficient η. However, the value η=1 can be adopted in wide temperature range (−10° C. to +40° C.) in the present embodiment. Also, the driving time Xt may be set as a time, during which tilting of the X-axis tilt sensor 18 is tilted to 0 or slightly over 0 when the X-axis tilting motor 12 is driven for the time Xt.

However, the liquid in the sensor overflows and actual angle of the X-axis tilt sensor 18 is detected as a value higher than 3', for instance. Therefore, the X-axis tilting motor 12 is stopped and standby for a certain time until the convergence (Step 07). In the present embodiment, the certain time is the maximum time (e.g. about 1.6 seconds) not simply influenced by temperature and the like. The maximum time may be determined by giving consideration on the viscosity or the like of the liquid in use.

When it is confirmed that detection angle of the X-axis tilt sensor 18 is within 3', for example (Step 08), the X-axis tilting motor 12 is controlled by feedback control so that output value of the X-axis tilt sensor 18 will be 0 based on the detection results of the X-axis tilt sensor 18 (fine adjustment; Step 09).

In case that the X-axis tilting motor 12 is driven at the speed V3 for the driving time Xt and if detection angle of the X-axis tilt sensor 18 is more than 3', it should go back to the procedure to drive the X-axis tilting motor 12 so that detection angle of the X-axis tilt sensor 18 is to be 0° (Step 01), and the leveling procedure is repeated.

The leveling procedure is performed for the Y-axis and the Y-axis tilt sensor 19 similarly.

Figure 3:
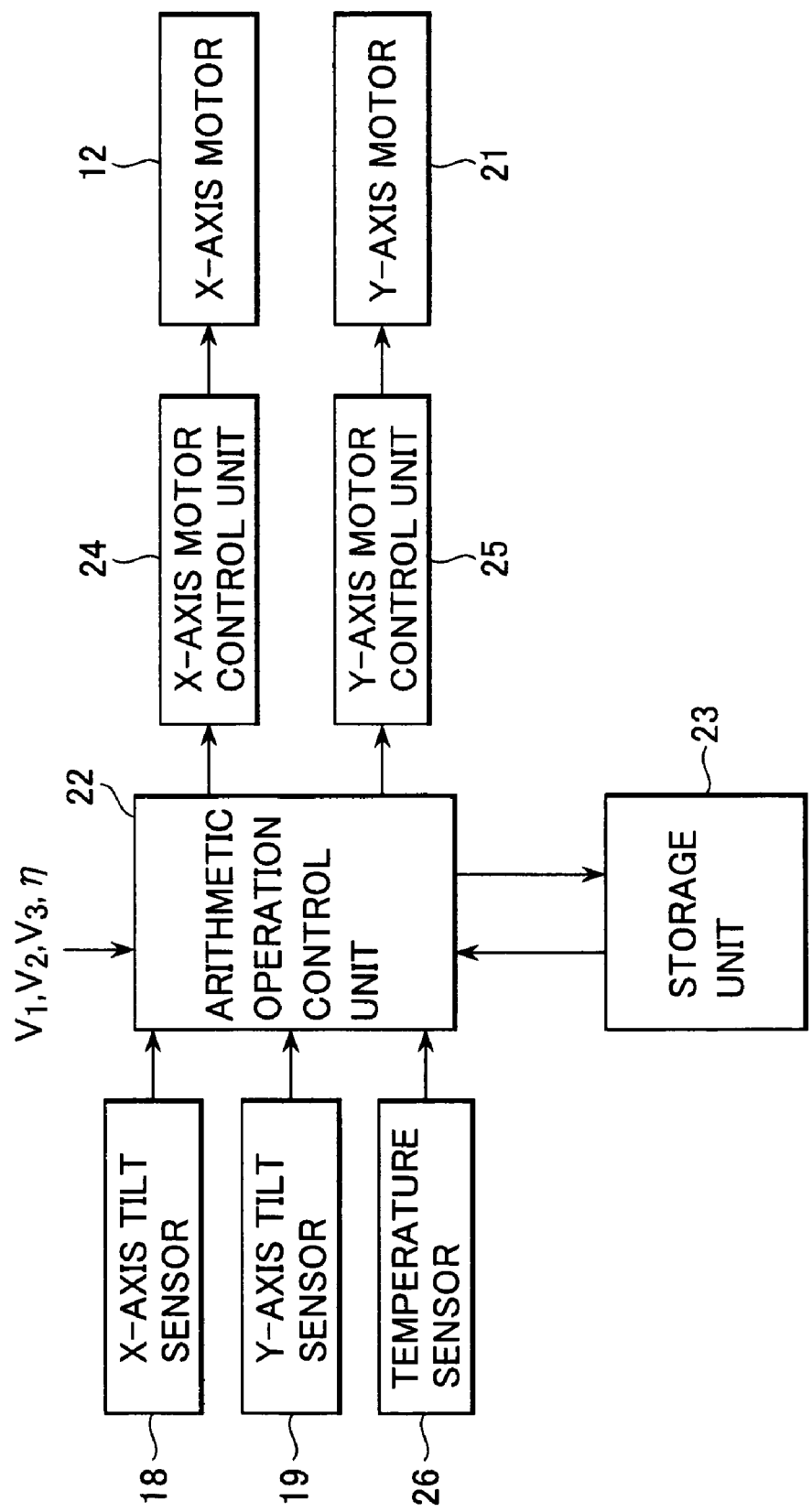
FIG. 3 is a block diagram to show general outline of the embodiment of the present invention.

FIG. 3 shows general outline of the present invention. In the figure, reference numeral 22 denotes an arithmetic operation control unit, numeral 23 denotes a storage unit, numeral 24 denotes an X-axis motor control unit, 25 represents a Y-axis motor control unit, and 26 indicates a temperature sensor to detect temperature within the surveying instrument.

Figure 2:
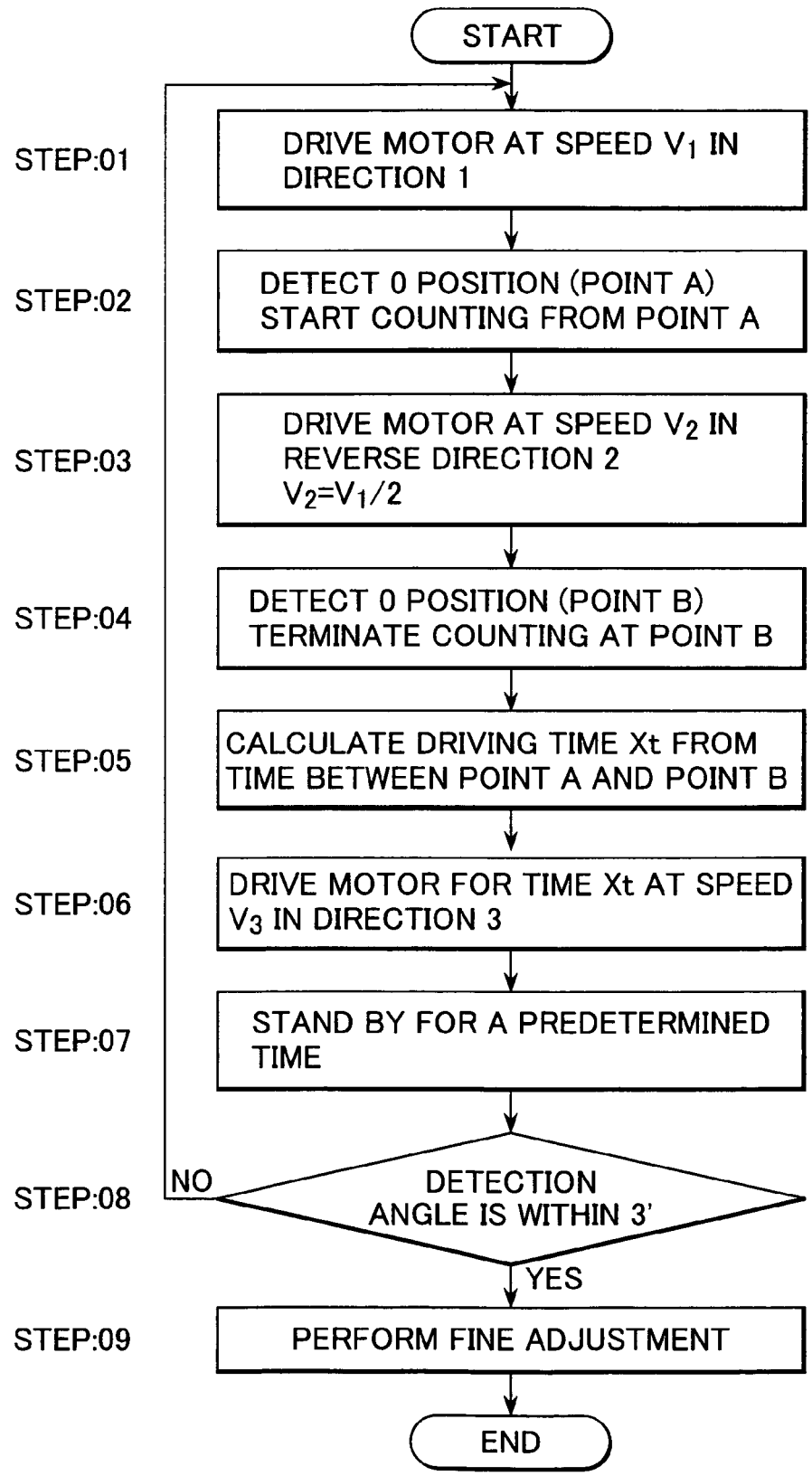
FIG. 2 is a flow chart to show the leveling operation in the embodiment of the present invention.

In the storage unit 23, a sequence program to perform leveling sequence as shown in FIG. 2 is stored, and various types of data necessary for leveling operation such as the speed V1, speed V2, and speed V3 and the response delay coefficient η to match the temperature are stored.

By the detection of the temperature sensor 26, the response delay coefficient η to match the temperature stored in the storage unit 23 is selected, and the driving time Xt is determined.

Now, brief description will be given on operation in connection with the above arrangement.

When the leveling operation is started, the arithmetic operation control unit 22 determines tilting direction based on signals from the X-axis tilt sensor 18 and the Y-axis tilt sensor 19. The X-axis tilting motor 12 and Y-axis tilting motor 21 are driven via the X-axis tilting motor control unit 24 and the Y-axis tilting motor control unit 25 so that tilting direction will be 0 (Step 01). Also, at the moment when the detection signals from the X-axis tilt sensor 18 and the Y-axis tilt sensor 19 are turned to 0, the X-axis tilting motor 12 and the Y-axis tilting motor 21 are driven reversely at the speed V2 until signals from the X-axis tilt sensor 18 and the Y-axis tilt sensor 19 will be turned to 0 (Step 02-Step 04).

The arithmetic operation control unit 22 obtains time difference T, i.e. a difference between the time when a value of 0 is detected at the X-axis tilt sensor 18 and the time when a value of 0 is detected at the Y-axis tilt sensor 19, and calculates Xt based on the response delay coefficient η and drives the X-axis tilting motor 12 and the Y-axis tilting motor 21 by the time Xt at the speed V3. After driving, the arithmetic operation control unit 22 stands by for a certain time (Step 05-Step 07).

Next, it is judged whether detection angle of the X-axis tilt sensor 18 and the Y-axis tilt sensor 19 is within 3' or not. If it is within 3', fine adjustment is performed. And then, the leveling operation is completed. In case that the detection angle is more than 3', it must go back to Step 01 of the sequence, and leveling is performed again (Step 08 and Step 09).

According to the present invention, based on the time between 0 points by the detection of 0 points in reciprocal operation, the leveling operation can be converged up to the position where the tilt sensor can detect approximately. Because the driving speed V3 of the motor is obtained in advance based on the characteristics of the X-axis tilt sensor 18 and the Y-axis tilt sensor 19, it is possible to minimize the repeating of tilting operation to converge the tilting. This contributes to the shortening of leveling time and to quick completion of the leveling operation.

What is claimed is:

1. A leveling method in a device main unit with tilt sensors, wherein said method comprises a step of obtaining a response delay of said tilt sensors in advance, a step of tilting said device main unit in a first direction so that said tilt sensors detect a first 0 point, a step of tilting said device main unit in a second direction reverse to said first direction so that a second 0 point is detected after said first 0 point has been detected, a step of obtaining a time up to the detection of both 0 points, a step of calculating a driving time to tilt in the first direction further from said second direction based on said time and said response delay, a step of tilting said device main unit for the driving time, a step of maintaining tilting condition for a predetermined time after tilting and a step of converging by performing leveling operation based on detection result of said tilt sensors after the predetermined time passing.

2. A leveling method according to claim 1, wherein the driving speed to tilt in said second direction is ½ of the driving speed to drive in said first direction, and driving speed to tilt further from said second direction to said first direction is the same as the driving speed in said second direction.

3. A leveling method according to claim 1, wherein the driving time to tilt further from said second direction to said first direction is ⅓ of the time for detection of both said 0 points.

4. A leveling method according to claim 1, wherein the time to tilt further from said second direction to the first direction and to maintain the tilting condition after tilting is shorter than 1.6 seconds.

5. A leveling device comprising a device main unit, tilt sensors provided with said device main unit and a motor for tilting and driving said device main unit and a control unit for controlling said motor, wherein said control unit obtains a response delay of said tilt sensors in advance, tilts said device main unit in a first direction so that said tilt sensors detect a first 0 point, tilts said device main unit in a second direction reverse to said first direction so that a second 0 point is detected after said first 0 point has been detected, obtains a time up to the detections of both 0 points, calculates a driving time to tilt in the first direction further based on said time and said response delay, tilts said device main unit for the driving time, maintains tilting condition for a predetermined time after tilting, and converges by leveling operation based on the detection of said tilt sensors after the predetermined time passing.

* * * * *